Feb. 6, 1962 W. E. EHRHART 3,019,658
WORKING-TIME RECORDER
Filed March 30, 1960
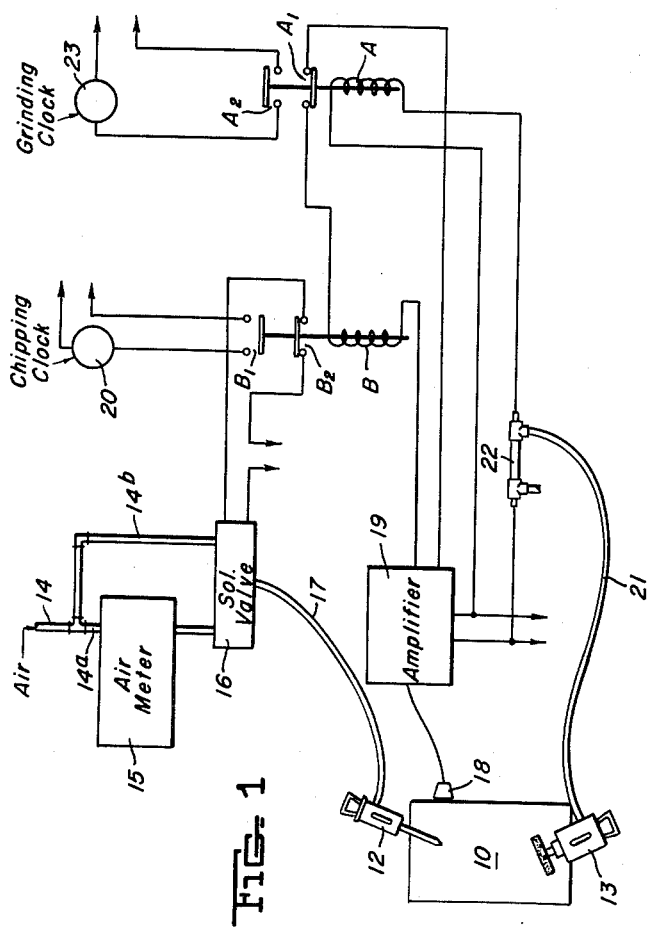
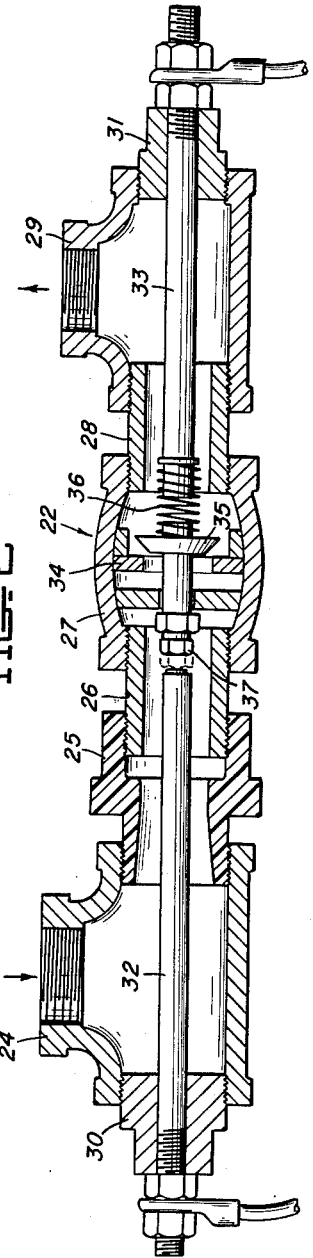
INVENTOR
WILLIAM E. EHRHART
By Donald G. Dalton
Attorney

3,019,658
WORKING-TIME RECORDER
William E. Ehrhart, Titusville, Pa., assignor to United States Steel Corporation, a corporation of New Jersey
Filed Mar. 30, 1960, Ser. No. 18,681
8 Claims. (Cl. 73—432)

This invention relates to an improved working-time recorder.

In an industrial plant need may arise for reliable information as to how much time a workman devotes to performing a particular operation or how much material he consumes. Such information is useful, for example, for computing incentive payments or for increasing plant efficiency. One difficulty with many automatic working-time recorders is that they indicate work is being performed when actually equipment is idling. My recorder is particularly useful in an iron foundry where a workman uses a pneumatically operated chipping tool and occasionally a grinder on a rough casting to remove excess metal, such as flashings, gates and risers, before the casting is machined. The recorder can furnish information as to how much actual time the workman devotes both to chipping and grinding and how much air he consumes in operating the chipping tool. Nevertheless the invention is not limited to this particular application, but may be used elsewhere for overcoming similar problems. For convenience, I describe my recorder as applied to chipping and grinding operations in a foundry, but this description is not intended to limit the invention.

An object of my invention is to provide an improved recorder which registers only when a workman is actually performing a particular operation and automatically ceases to register when equipment is idling.

A further object is to provide an improved recorder which has the foregoing characteristic and which registers both the time a workman devotes to an operation and the quantity of material he consumes.

A further object, as applied to a foundry, is to provide an improved recorder which automatically registers the time a workman devotes to chipping and to grinding and the quantity of air he uses for operating the chipping tool, but which automatically ceases to register when the chipping tool is idling.

In accomplishing these and other objects of the invention, I have provided improved details of structure, a preferred form of which is shown in the accompanying drawing, in which:

FIGURE 1 is a schematic diagram of the circuits of my recorder; and

FIGURE 2 is a longitudinal sectional view of an air-operated switch embodied in the recorder.

FIGURE 1 shows a workpiece 10, in this instance a casting, on which a conventional pneumatically operated chipping tool 12 and occasionally a pneumatically operated grinder 13 are used. Compressed air for operating the chipping tool is supplied from a line 14, which has a branch 14a leading to a conventional air meter 15 and thence to a solenoid-operated valve 16, and a bypass 14b leading directly to said valve. A line 17 extends from the valve to the chipping tool. If the tool operates idly, the valve automatically assumes a position for air to flow to the tool through the bypass 14b to the exclusion of the meter. If the tool is actually chipping the casting, the valve automatically assumes a position for air to flow to the tool through meter 15 to the exclusion of the bypass. The mechanism for positioning the valve is described hereinafter.

My recorder includes a conventional microphone 18 and amplifier 19 connected thereto and energized through a suitable power source. When the chipping tool 12 operates against the casting 10, the casting of course vibrates. The microphone is placed on the casting, where it picks up the vibrations and transmits a signal to the amplifier. The circuit also includes two relays A and B. Relay A has front and back contacts $A_1$ and $A_2$, but the relay is normally energized; hence FIGURE 1 shows the front contact $A_1$ closed and the back contact $A_2$ open. Relay B likewise has front and back contacts $B_1$ and $B_2$, which FIGURE 1 shows in their normal positions with the relay not energized. The coil of relay B is connected to the output terminals of amplifier 19 in series with contact $A_1$. Thus relay B picks up when the microphone transmits a signal to the amplifier, whereupon contact $B_1$ closes and completes a current path to a chipping clock 20. Contact $B_2$ is connected in series with the solenoid of valve 16 and normally completes a current path which energizes this solenoid. When the solenoid is energized, the valve is positioned for air to flow through the bypass 14b. When relay B picks up and contact $B_2$ opens, the solenoid is de-energized, whereupon valve 16 shifts to a position for air to flow through meter 15. Thus the chipping clock 20 registers the time the chipping tool 12 operates against the casting 10 and the air meter 15 registers the volume of air consumed, but neither the clock nor the meter registers when the tool operates idly.

A line 21 supplies compressed air to the grinder 13. This line contains an air-operated switch 22, the details of which are described hereinafter. Switch 22 is connected in series with the coil of relay A. As long as the grinder is not running, the switch remains closed to energize the relay and permit operation of the chipping clock 20 and air meter 15 as just described. When the grinder runs, switch 22 opens, whereupon relay A drops out, contact $A_1$ opens and contact $A_2$ closes. Opening of contact $A_1$ locks out relay B and thus prevents vibrations caused by grinding from operating the chipping clock 20. Closing of contacts $A_2$ completes a current path to a grinding clock 23 which registers the time the grinder operates.

FIGURE 2 shows details of the air-operated switch 22. The switch is mounted in a section of line 21 which includes an inlet T-fitting 24, a bushing 25 of insulating material threadedly connected with said fitting, a nipple 26 threadedly connected with said bushing, a valve housing 27 threadedly connected with said nipple, another nipple 28 threadedly connected with said housing, and an outlet T-fitting 29 threadedly connected with the latter nipple. Pipe plugs 30 and 31 are threadedly engaged with the outer ends of the respective T-fittings 24 and 29. Metal rods 32 and 33 are fixed within the respective pipe plugs 30 and 31 and extend inwardly to the vicinity of the valve housing 27. A valve seat 34 is fixed within the valve housing, and a cooperating closure member 35 is movably mounted therein on the downstream side of the seat. A spring 36 acts between rod 33 and closure member 35 to hold the closure member against the seat as long as no air flows through the line. Rod 32 forms one electrical terminal, and a second terminal 37 is mounted on the upstream side of the closure member 35. When the closure member engages the seat, the two terminals abut to complete the current path to the coil of relay A. When air flows through the line, the closure member is forced away from the seat and the terminals are separated to break this current path.

From the foregoing description it is seen that my invention affords a simple mechanism for automatically registering the time a workman devotes to such operations as chipping or grinding a casting. In the illustration chipping is the dominant operation; hence both the time and air flow are measured, and measurements are halted when the tool operates idly. However, this obviously can be varied. One grinder may be used by more than one workman, in which event a suitable selector switch can be connected in parallel with the air operated switch to enable other workmen's chipping clocks to register while one workman is grinding.

While I have shown and described only a single embodiment of my invention, it is apparent that modifications may arise. Therefore, I do not wish to be limited to the disclosure set forth but only by the scope of the appended claims.

I claim:

1. The combination, with a pneumatically operated tool which induces vibrations in a workpiece when it performs an operation thereon, of a recorder comprising an air meter for measuring the volume of air consumed by said tool, a bypass for delivering air to said tool around said meter, a solenoid-operated valve connected to said bypass and said meter and having a first position in which it directs air through said bypass to the exclusion of said meter and a second position in which it directs air through said meter to the exclusion of said bypass, means for producing a signal in response to vibrations in the workpiece, and means operatively connecting said signal producing means and the solenoid of said valve, whereby the valve assumes its first position in the absence of vibrations in the workpiece, and its second position when operation of said tool induces vibrations in the workpiece.

2. The combination, with a pneumatically operated tool which induces vibrations in a workpiece when it performs an operation thereon, of a recorder comprising an air meter for measuring the volume of air consumed by said tool, a bypass for delivering air to said tool around said meter, a solenoid-operated valve connected to said bypass and said meter and having a first position in which it directs air through said bypass to the exclusion of said meter and a second position in which it directs air through said meter to the exclusion of said bypass, a circuit for operating the solenoid of said valve, a microphone adapted to be placed on the workpiece for producing a a signal in response to vibrations in the workpiece, an amplifier connected to said microphone, and means operatively connecting said amplifier and said circuit, whereby the solenoid moves the valve to its first position in the absence of vibrations in the workpiece and to its second position when operation of said tool induces vibrations in the workpiece.

3. The combination, with a pneumatically operated tool which induces vibrations in a workpiece when it performs an operation thereon, of a recorder for registering the time the tool operates on the workpiece and the volume of air the tool consumes in actual operation on the workpiece, said recorder comprising a clock, an operating circuit for said clock, an air meter, valve means for selectively directing air through or around said meter as the air flows to said tool, means for producing a signal in response to vibrations in the workpiece, and means operatively connecting said signal-producing means with both said operating circuit and said valve means, whereby the circuit is completed to operate the clock and the valve means directs air through said meter only when operation of said tool induces vibrations in the workpiece.

4. The combination, with a pneumatically operated tool which induces vibrations in a workpiece when it performs an operation thereon, of a recorder for registering the time the tool operates on the workpiece and the volume of air the tool consumes in actual operation on the workpiece, said recorder comprising a clock, an operating circuit for said clock, an air meter, a bypass, a solenoid-operated valve connected to said bypass and said meter and having a first position in which it directs air through said bypass to the exclusion of said meter and a second position in which it directs air through said meter to the exclusion of said bypass, means for transmitting air from said valve to said tool, a circuit for operating the solenoid of said valve, a microphone adapted to be placed on the workpiece for producing a signal in response to vibrations in the workpiece, an amplifier connected to said microphone, and means operatively connecting said amplifier with both said circuits, whereby the operating circuit for said clock is completed to operate the clock and said valve moves to its second position only when operation of said tool induces vibrations in the workpiece.

5. The combination, with a power-operated chipping tool and a power-operated grinder which induce vibrations in a casting as they chip or grind it, of a working-time recorder for said chipping tool comprising a clock, an operating circuit for said clock, means for producing a signal in response to vibrations in the casting, means operatively connecting said signal-producing means and said circuit, whereby the circuit is completed to operate said clock only when operation of said chipping tool induces vibrations in the casting, and means operatively connected with said grinder for locking out said circuit when said grinder is operated.

6. The combination, with a power-operated chipping tool and a power-operated grinder which induce vibrations in a casting as they chip or grind it, of a working-time recorder for said chipping tool comprising a clock, an operating circuit for said clock, a microphone adapted to be placed on the casting for producing a signal in response to vibrations in the casting, an amplifier connected to said microphone, means operatively connecting said amplifier and said circuit, whereby the circuit is completed to operate said clock only when operation of said chipping tool induces vibrations in the casting, and means operatively connected with said grinder for locking out said circuit when said grinder is operated.

7. The combination, with a pneumatically operated chipping tool and a power-operated grinder which induce vibrations in a casting as they chip or grind it, of a recorder for registering the time the chipping tool chips the casting and the volume of air the chipping tool consumes in actually chipping the casting, said recorder comprising a clock, an operating circuit for said clock, an air meter, valve means for selectively directing air through or around said meter as the air flows to said chipping tool, means for producing a signal in response to vibrations in the casting, means operatively connecting said signal-producing means with both said operating circuit and said valve means, whereby the circuit is completed to operate the clock and the valve means directs air through said meter only when operation of said chipping tool induces vibrations in the casting, and means operatively connected with said grinder for locking out said circuit when said grinder is operated.

8. The combination, with a pneumatically operated chipping tool and a power-operated grinder which induce vibrations in a casting as they chip or grind it, of a recorder for registering the time the chipping tool chips the casting and the volume of air the chipping tool consumes in actually chipping the casting, said recorder comprising a clock, an operating circuit for said clock, an air meter, a bypass, a solenoid operated valve connected to said bypass and said meter and having a first position in which it directs air through said bypass to the exclusion of said meter and a second position in which it directs air through said meter to the exclusion of said bypass, means for transmitting air from said valve to said tool, a circuit for operating the solenoid of said valve, a microphone adapted to be placed on the casting for producing a signal in response to vibrations in the casting, an amplifier connected to said microphone, means operatively connecting said amplifier with both said circuits, whereby the operating circuit for said clock is completed to operate the clock and said valve means moves to its second position only when operation of said chipping tool induces vibrations in the casting, and means operatively connected with said grinder for locking out said circuits when said grinder is operated.

References Cited in the file of this patent

UNITED STATES PATENTS

| | | |
|---|---|---|
| 2,340,114 | Duis | Jan. 25, 1944 |
| 2,782,637 | Scheldorf | Feb. 26, 1957 |
| 2,866,301 | Koulicovitch | Dec. 30, 1958 |
| 2,946,646 | Bower et al. | July 26, 1960 |